United States Patent [19]

De Lima Castro Neto

[11] E Patent Number: Re. 31,706

[45] Reissued Date of Patent: Oct. 16, 1984

[54] DEVICE FOR CLOSING BAGS

[76] Inventor: Eduardo De Lima Castro Neto, Rua Sao Luiz Gonzaga, 912, 20.000 Rio de Janeiro, Brazil

[21] Appl. No.: 321,835

[22] Filed: Nov. 16, 1981

Related U.S. Patent Documents

Reissue of:

[64] Patent No.: 4,175,782
Issued: Nov. 27, 1979
Appl. No.: 885,043
Filed: Mar. 9, 1978

[51] Int. Cl.[3] ..... B65D 33/34
[52] U.S. Cl. ..... 292/307 R
[58] Field of Search ..... 292/307, 315, 317, 318, 292/320, 322, 323, 325, 326

[56] References Cited

U.S. PATENT DOCUMENTS 1,821,418 9/1931 Brooks ..... 297/307 R
2,517,376 8/1950 Artyt et al. ..... 292/320 X

FOREIGN PATENT DOCUMENTS 2306137 10/1976 France ..... 292/320
471365 3/1952 Italy ..... 292/307 R
608795 9/1948 United Kingdom ..... 292/307 R

*Primary Examiner*—Richard E. Moore
*Attorney, Agent, or Firm*—Beveridge, DeGrandi and Kline

[57] ABSTRACT

A simple and quickly appliable bag closure device which automatically tightens the neck of the bag. According to a preferred embodiment of the invention the device comprises a label holder in the form of a generally flattened base and a cover for closure over the base. Said base and cover are provided with means permitting them to be sealed in the closed position by means of a security seal. The base is centrally formed with a cavity shaped to receive a lever which is a separate part of the label holder although connected thereto by a string fixed at one end to one of various points along the length of the lever and at the other end to a label. The lever is formed, with relation to the cavity, so that it may be pivoted about one end to apply an automatic tightening to the neck of the bag about which the lever is passed before being placed in the cavity. The closure of the cover over the base also closes the lever in the cavity.

12 Claims, 9 Drawing Figures

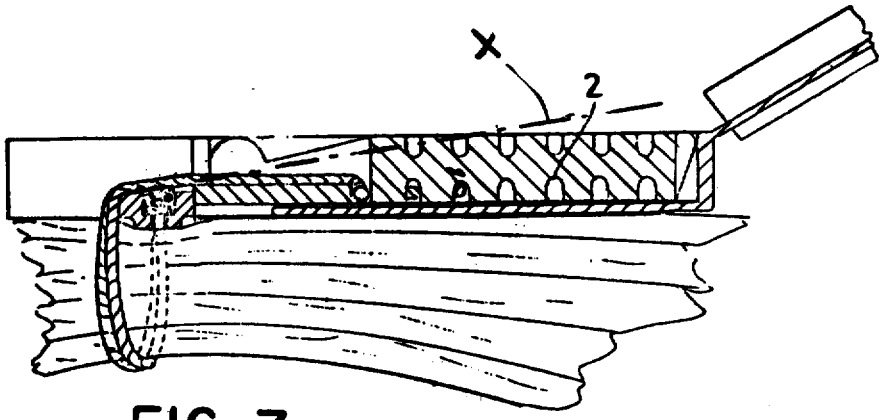
FIG. 7
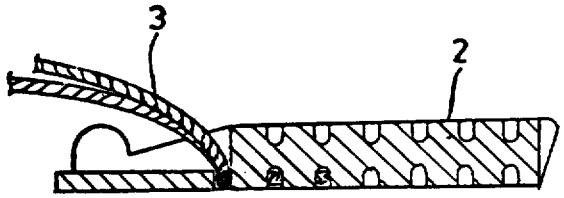
(a)
FIG. 5
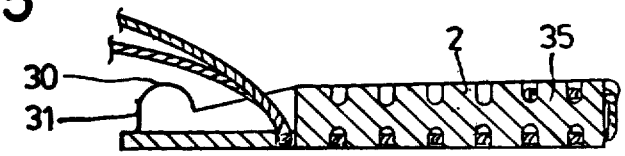
(b)
FIG. 9
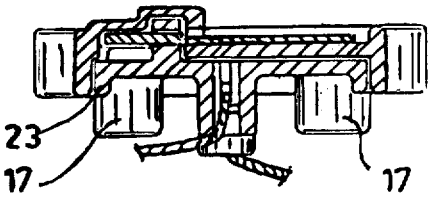

DEVICE FOR CLOSING BAGS

Matter enclosed in heavy brackets [ ] appears in the original patent but forms no part of this reissue specification; matter printed in italics indicates the additions made by reissue.

*Reference to Related Application*

*This is a reissue of my U.S. Pat. No. 4,175,782 which issued on Nov. 27, 1979, for a device for closing bags.*

The present invention refers to a device for closing bags.

Bags are conventionally closed by means of a string tightened around the region below the mouth thereof. The string is then tied and sealed by means of a security seal, that is to say, the classical lead seal or the newer inviolable metal or plastic seals. The gathering of the neck of the sack or bag and the tightening of the string produces many problems and disadvantages since insufficient tightening permits an unauthorized person to insert a tool through the mouth of the bag and along the interior of the neck until it reaches the contents. Inadequate tightening also permits, in certain circumstances, that the complete closure arrangement (string, seal, label and the like) be slid upwardly and, in order to prevent its complete removal from the bag, the mouth thereof is sometimes made more bulky by means of a hem forming a tunnel through which a cord is permanently threaded. This makes the bag more expensive.

Apart from it being necessary to effect considerable tightening to form the neck of the bag, the tightening has to be maintained while the string is firmly tied thereafter and/or the security seal applied. This is problematic since it makes the closure of bags by women more difficult.

Another disadvantage of most conventional bag closing systems is that opening can only be effected by cutting the string. Apart from being time-consuming, carelessness in cutting the string can also damage the bag itself which, for security reasons, has then to be substituted by a new one.

An object of the present invention is to provide a bag closing device which applies a pre-selected tightening to the mouth thereof with a minimum of force.

Another object of the invention is a bag closing device of said type which may be applied rapidly, also permitting the application of a label, without it being necessary to tie or tighten the string.

A still further object of the invention is to provide a bag closing device which may be opened rapidly without it being necessary to cut the string and which may be used a large number of times.

In accordance with the present invention, a device for closing bags is characterized by comprising: a lever provided with means for fixing one end of a string or the like to at least one point along its length and a guide for the string or the like at a fixed point on the lever which is spaced from a first end thereof; an element defining an open topped elongated cavity for the lever and having means for fixing the other end of the string or the like to at least one point thereof, string guide means disposed substantially axially with respect to the cavity and a support in said cavity for said first end of the lever so that, on placing the lever within the cavity, the contact point between said first end and the support lies between the guide on the lever and the guide means on said element, defining approximately a straight line;

and a closure member for closing said top of the cavity with the lever therein, said closure member and said element being provided with means permitting their immobilization with respect to each other by the application of a security seal, said string fixing means on at least one of said element and lever defining a plurality of fixing points to permit the adjustment of the length of the string or the like.

In the preferred embodiment the plurality of fixing points permitting adjustment of the length of the string are distributed along part of the length of said lever. The first end of the lever about which it pivots with respect to the support in the cavity, comprises two generally rounded surfaces supported from each other to define a space aligned with a slot through said support so as to permit passage of the string. The string guide on the lever comprises an orifice formed therein and through which the string passes so that its end may be fixed to any one of said fixing points. The fixing points comprise a series of teeth distributed along the lower side of the lever (with relation to the cavity when in use) and another series of teeth along the upper side of the lever so that the string may be adjusted in a range equal to twice the length of that part of the lever which is provided with the teeth.

The invention will now be described in greater detail, by way of example, with reference to the attached drawings, in which.

Figure 4:
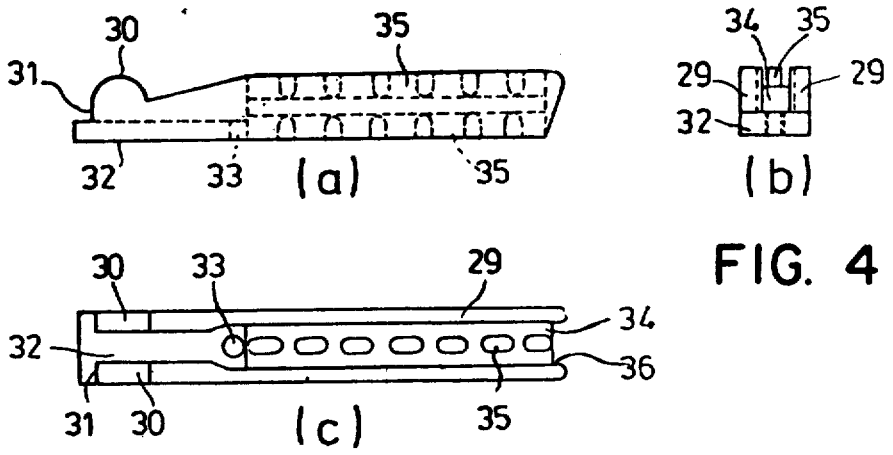
Figure 6:
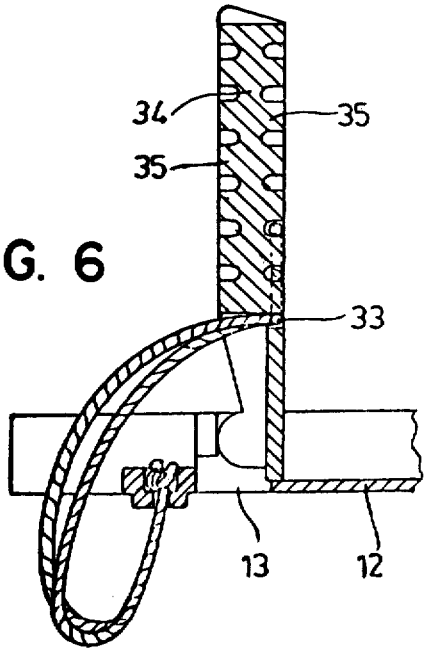

FIGS. 4(a), (b) (c) comprise a side elevation, a front elevation and an upper plan view of the lever;

FIGS. 5(a) and (b) show the lever with two different adjustments of the length of the string;

FIG. 6 shows the lever and part of the label holder in section during the application of the device to a bag;

FIG. 7 is a sectional detail of the device applied to a bag; and

Figure 8:
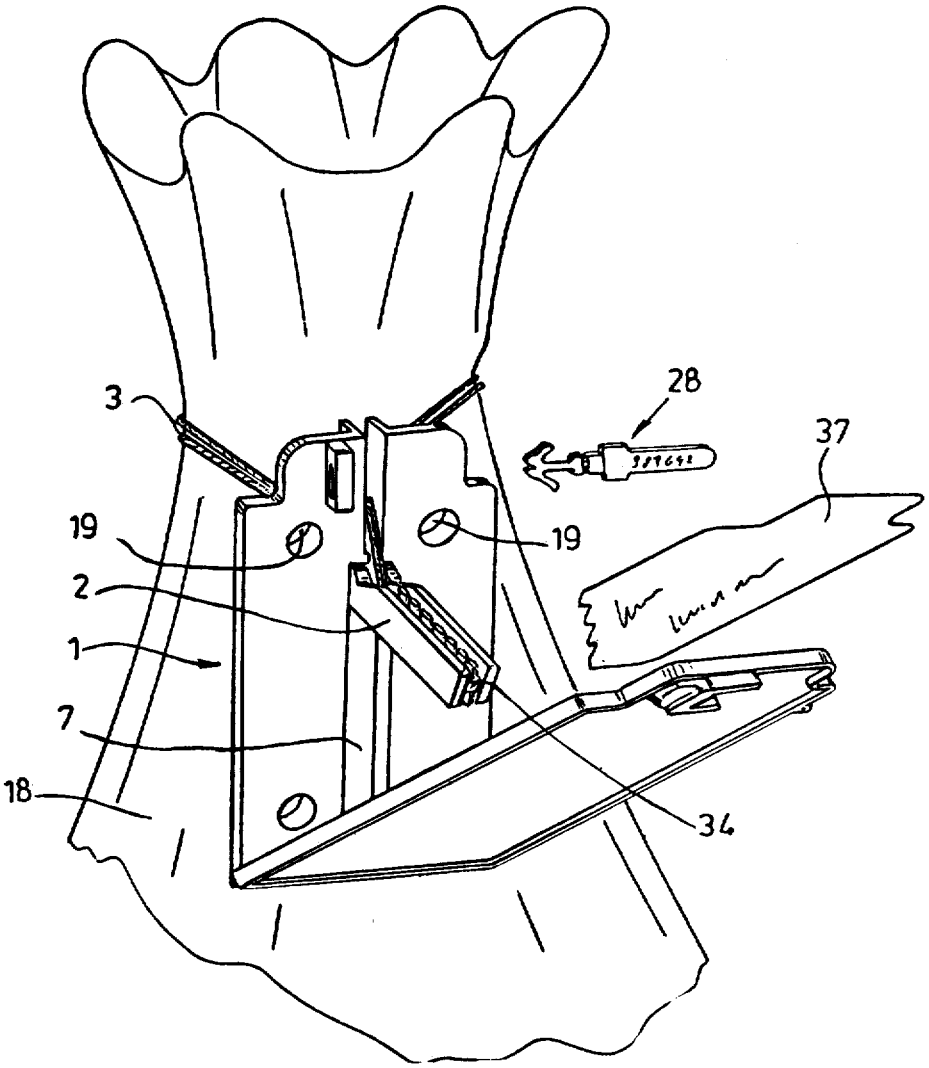

FIG. 8 is a perspective view showing the application of the device to a bag.

FIG. 9 is a transverse sectional view taken through the capsule when the device is closed and sealed.

With reference now to the drawings which show a preferred embodiment of the invention in which the bag closing device also acts as a label holder, the device comprises a label holder element 1, a lever 2 and a length of string 3 connecting these parts.

Figure 1:
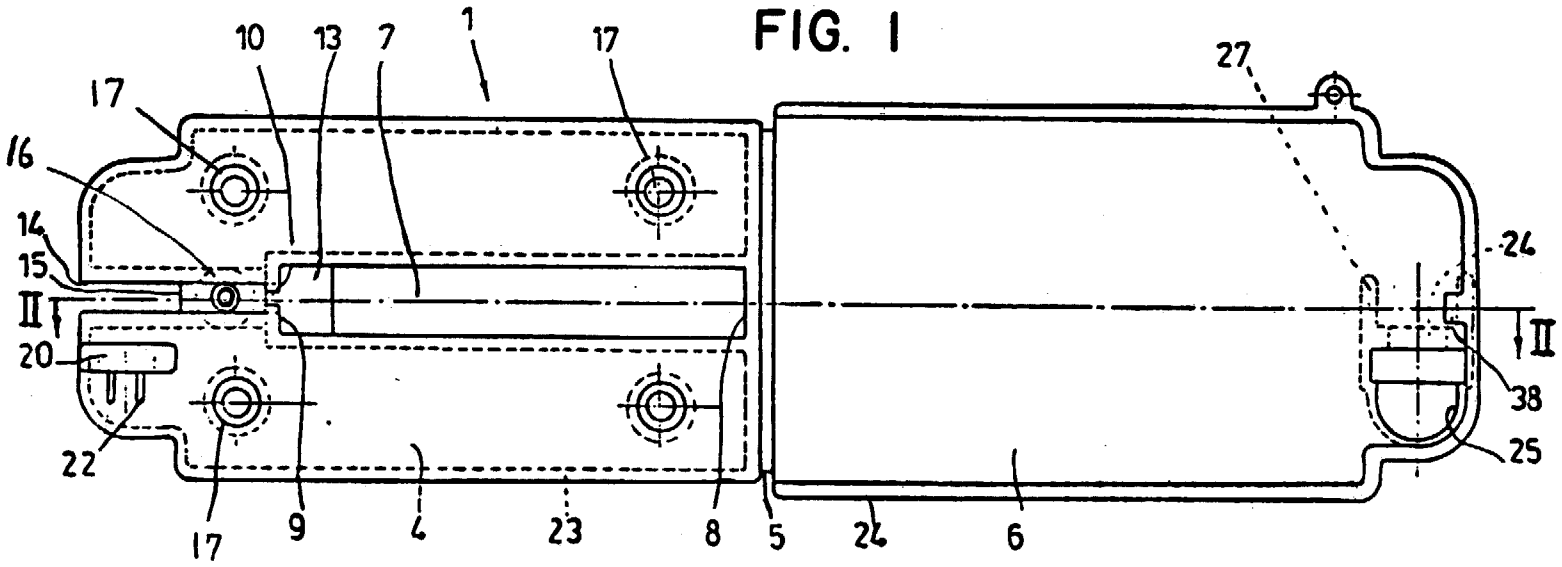
FIG. 1 is an upper plan view of a label holder in an open position, such being one component of a device manufactured in accordance with the invention.
Figure 2:
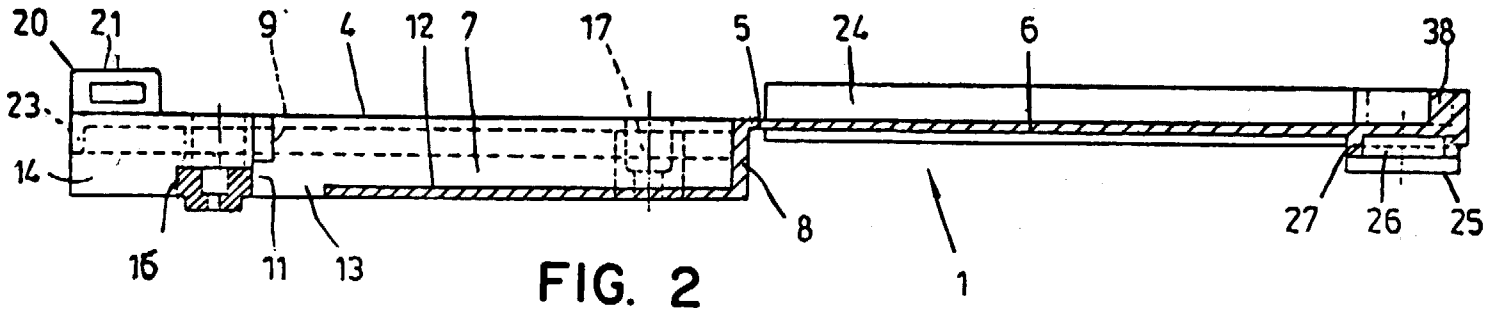
FIG. 2 is a section along line II—II of FIG. 1.

Referring mainly to FIGS. 1 and 2, the label holder 1 which is molded from plastic material (preferably molded from polypropylene) comprises a base part 4 connected by a section of reduced thickness 5 (plastic hinge) to an upper part or cover 6. Base part 4 is formed with an elongated central cavity 7 designed to receive lever 2 (see FIGS. 6, 7, 8). That end of cavity 7 which is adjacent to the plastic hinge 5 is closed by a vertical wall 8 whereas the other end has an upper half-wall 9 with a central slot 10, there being a re-entrance 11 underneath said wall. Adjacent re-entrance 11, the bottom 12 of cavity 7 is formed with a through opening 13 whose object is merely to facilitate manufacture of the part and is by no means essential.

Figure 3:
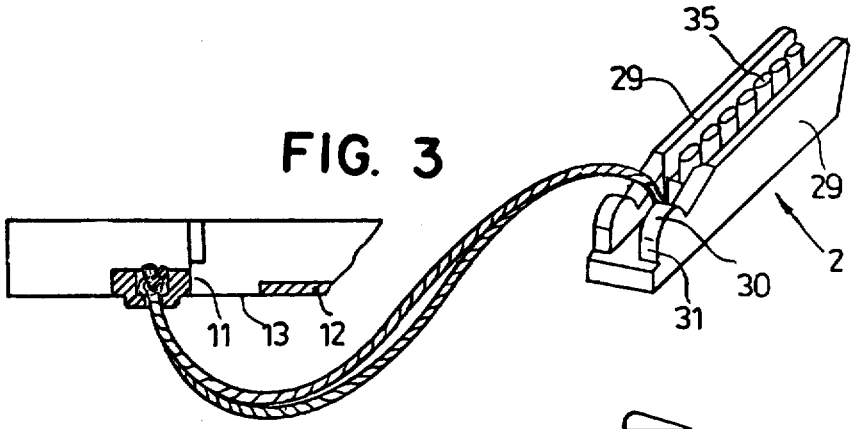
FIG. 3 shows a detail of the label holder together with a perspective view of a lever to be used therewith.

The base end 4, opposite hinge 5, is formed with a slot 14 which is partially obstructed at 15 by an orifice and cavity formation 16, the orifice having a diameter suitable for receiving the two ends of string 3 whereas the cavity receives a knot formed therebetween so as to fix the string to base 4 (see FIGS. 3 and 6). Slot 14 then continues so as to be in communication with slot 10 in the end half-wall 9 of the cavity, there being an upward step in the external region of the re-entrance 11.

Base 4 is also formed with four additional orifice and cavity formations 17, two in each half of the base, to permit device 1 to be fixed to a bag 18 by rivets 19 or the like (see FIG. 8), if so desired.

On one side of slot 14, the upper surface of base 4 is formed with a vertical bridge 20 parallel to cavity 7 and forming a rectangular opening 21. Two small ribs 22 are formed to one side of the bridge, said ribs having upper surfaces substantially at the same level as the lower surface of rectangular opening 21.

Finally, base 4 is formed around its periphery with a small downwardly directed flange 23 which serves to reinforce the structure and to be received within a peripheral reinforcement flange 24 on cover 6.

Cover 6 is shaped so as to cover base 4 snugly, its peripheral dimensions being slightly greater so as to permit flange 23 to be received within flange 24. The upper surface (in the closed condition of label holder 1) of the free end of cover 6 is formed with an open bottomed capsule 25 provided with a rectangular lateral entrance opening 26 at the level of the upper surface of the cover. On each side of opening 26 there are guides 27. The rectangular opening 26 is substantially identical to opening 21 in bridge 20 formed on the base, the capsule being positioned (on doubling cover 6 over base 4) to receive bridge 20 against the inner wall of the capsule with the two openings 21 and 26 aligned and two ribs 22 within the capsule. In these conditions the insert or head end of a security seal 28 (FIG. 8) may be introduced through openings 21 and 26 so as to seal the label holder 1 in the closed position with the top of cavity 7 closed. Security seal 28, capsule 25 and bridge 20 may be as described in greater detail in my U.S. Pat. application No. 670,318 filed on Mar. 25, 1976.

Referring now to FIGS. 3–7, lever 2, which is preferably made of polystyrene, fits relatively snugly, but without any interference, within cavity 7 and has a pair of parallel side walls 29 along its length so as to define a width substantially equal to that of the cavity. At its front end about which it is designed to pivot, walls 29 are inclined downwardly followed by convexly curved portions 30 which are substantially semi-circular, ending in straight vertical edges 31. The bottom 32 of this end has the width of the lever and projects slightly behind the vertical end 31 so as to fit in use within re-entrance 11 at the corresponding end of cavity 7 (see FIG. 7). Bottom 32 terminates in the direction of the remaining part of the lever, in an orifice 33 which serves as a guide for the string 3. Behind this orifice, lever 2 comprises a web 34 extended between lateral walls 29 and formed with a series of pins or teeth 35 on its upper and lower surfaces. At the far end of the lever, side walls 29 project slightly behind the central web 34 so as to define a re-entrance 26 (FIG. 4c).

As already mentioned, string 3 is doubled and its free ends are inserted (upwardly) through the orifice in formation 15 in the base of the label holder and then tied together so that the knot is received in the cavity in said formation without being able to pass through the orifice. The two extensions of the string, the ends of which form a loop, are inserted (downwardly) through orifice 33 in the bottom of the lever (see FIG. 3). Depending on the length of string required, the loop formed at its end may be placed over a selected one of the pins or teeth 35 on the lever. For example, FIGS. 5a and 6 show the string fixed to the second pin 35 counted from the orifice 33 on the lower side of the lever whereas in FIG. 5b the length of the string is reduced by passing it along the complete lower surface of the lever and then around its distal end where it is received in re-entrance 36, the end loop of the string then being placed over the second pin 35 on the upper side of the lever. The lever shown therefore has a 12-position adjustment (six pins 35 on the lower side and six on the upper side) without ever changing the position where string 33 applies force to the lever, such position being defined by the guide orifice 33. The closure of the bag will now be described. Label holder 1 is preferably permanently riveted to the bag by rivets 19 (FIG. 8) although this is not essential. It may also be riveted transversely rather than vertically with respect to the neck of the bag. Lever 2 which is already fixed to string 3 but in all other manners is free with respect to label holder 1 (see FIG. 3), is first passed round the back of the bag and the string is then fitted into slot 14 at the end of base 4. The front end of lever 2 is then placed with its two semi-circular parts 30 against the half-wall 9 in cavity 7, the string passing through slot 10 in said wall and between the side walls 29 of the lever (see FIGS. 6 and 8). Lever 2 is then pivoted clockwise about its semi-circular parts 30 and the half-wall 9 until it lies substantially along cavity 7. Slightly before reaching the position in which it lies within the cavity, the lever finds an unstable equilibrium condition when the point from which string 33 leaves slot 14, the pivot points between half-wall 9 and semi-circular parts 30 and the point at which the string enters the orifice 33 in the lever become aligned (see line X in FIG. 7). Movement of the lever slightly behind this unstable equilibrium position will result in it entering and lying automatically in the cavity, giving a small click (FIG. 7). Should string 33 not be sufficiently tight for the correct functioning of the device, it will obviously be necessary to adjust the effective length of the string by diminishing it, for example, changing the fixing point of FIG. 5a to that shown in FIG. 5b. If the string becomes very tight and makes it impossible to finish the operation without breaking it, then an opposite adjustment should be made. It should be observed, however, that such adjustment only needs to be made on the first use since once the length of string has been established for a given type of bag, being subsantially inextensible, it will not be necessary to modify it at a later date.

In this condition with lever 2 lying in cavity 7, the bag 18 is already in the closed position and ready for the application of a label and for sealing. A label 37 is then placed on base 4 so as to cover the lever and the cavity, the transparent cover 6 then being closed. It will be seen from FIGS. 1 and 2 that the inner side of cover 6 is formed centrally of its free end with a protuberance 38 which, on closing the cover, fits into slot 14 so as to close it and prevent any possibility of string 3 escaping during transport of the bag. With the device 1 closed in this manner, security seal 28 has its head introduced through opening 26 in capsule 25 and also through opening 21 in the bridge 20 formed on the base as shown in FIG. 9.

The closure of bag 18, and the application of label 37 and of security seal 28 is an extremely quick operation, that is to say, lever 2 and cord 3 are passed only once around the neck of the bag without any necessity to tighten it, the lever is placed in the operating position and pivoted until it lies in the cavity, very little force being necessary, label 37 is simply placed between base 4 and cover 6 while the latter is being closed and the security seal is then manually applied with a slight pressure. There is no tightening or tying of anything and no tools are necessary. The operation may be completed in no more than ten seconds and there is no possibility of any looseness in the closure.

It will also be observed that the arrangement of the present invention has, at least in this preferred form, a considerable advantage over prior bag closing systems using string in that it is not necessary to form a loop through which the neck of the bag has to be passed before tightening. In other words, the lever is not permanently fixed to the label holder part and can therefore be passed freely round the neck of the bag before being placed in the cavity for the closing operation. This greatly facilitates and accelerates the closure of the bag.

Preferably the complete label holder 1 is molded from transparent plastic, for example, polypropylene. The lever may also be made from transparent or colored but tougher plastic (polystyrene) whereas the seal is advantageously made from colored polypropylene.

Although only one preferred embodiment of the invention has been illustrated and described herein, many modifications and variations will be immediately apparent to those versed in the art. For example, the lever may have another shape provided that it may be pivoted and receive an easily adjustable length of string (the adjustment may be effected either on base 4 or on lever 2) whereas it is not necessary that the device also has the function of a label holder, in which case it would appear more like an elongated box having a cover and designed to receive a lever. It should also be observed that it is not necessary for the string and lever to pass or in fact even to reach the dead-center position (FIG. 7) for the device to work satisfactorily. A configuration in which such position is closely approached has proved to be perfectly satisfactory. It will therefore be understood that the scope of the invention should be limited merely by the following claims.

I claim:

1. A device for closing bags comprising:

(a) a lever provided with means for fixing one end of a string or the like to at least one point along its length and a guide for the string or the like at a fixed point on the lever which is spaced from a first end thereof;

(b) an element defining an open topped elongated cavity for the lever and having means for fixing the other end of the string or the like to at least one point thereof, said element being provided with string guide means disposed substantially axially with respect to the cavity and a support in said cavity for said first end of the lever so that, on placing the lever within the cavity, the contact point between said first end and the support lies between the guide on the lever and the guide means on said element, defining approximately a straight line; and (c) a closure member for closing said top of the cavity with the lever therein, said closure member and said element being provided with means permitting their immobilization with respect to each other by the application of a security seal, said string fixing means on at least one of said element and lever defining a plurality of fixing points to permit the adjustment of the length of the string or the like.

2. Device according to claim 1 in which said plurality of fixing points permitting the adjustment of the length of said string means, are distributed along part of the length of said lever on its lower side between said guide and said second end of the lever.

3. Device according to claim 2 in which the upper side of said lever also has fixing points for the string means, distributed therealong between said guide and said second end.

4. Device according to claim 3 in which said fixing means on the lever comprises a series of pin means distributed along the upper and lower sides of said lever between said guide and said second end.

5. Device according to claim 4 in which said first end of the lever comprises two spaced generally rounded wall parts defining therebetween a space aligned with a slot through said support in the cavity, said slot permitting passage of said string means.

6. Device according to claim 5 characterized in that said guide on said lever comprises an orifice formed therethrough.

7. Device according to claim 1 in which said cavity defining element and said closure member are integral with each other, said closure member being adapted for being bent over said element for closing the cavity.

8. Device according to claim 7 in which said element and cover comprise a generally planar base and a cover of a label holder so that when said lever lies within said cavity, a label may be placed on the base before closure of said cover.

*9. A device for the closure and sealing of bags or the like, comprising, a base member, a lever associated with said base member to provide a fulcrum therebetween, first attachment means for fixing one end of a length of string or the like to a point which is stationary relative to the fulcrum, second attachment means for attaching the other end of the string or the like on said lever at a point which is spaced from the fulcrum, means permitting adjustment of the effective length of said string, said string when engaged with said attachment means forming a loop which is engageable about a bag, said lever being rotatably movable about the fulcrum to tighten the string around a bag until the lever arrives at a closed position, means for making both said first and second string attachment means substantially inaccessible at least when said lever is in said closed position, and means permitting said device to be sealed by a security seal when the lever is in said closed position.*

*10. A device according to claim 9 wherein the base member and the means for making the string attachment means inaccessible are shaped to hold a flat label therebetween.*

*11. A device for closing bags, comprising*

*a lever means including a fulcrum portion, first string fixing means for fixing a first end of a string or the like to the lever means,*

*an element defining a space for receiving the lever means, the element having a second string fixing means for fixing a second end of the string thereto, said element having support means cooperable with said fulcrum portion of said lever means so that said lever means is rotatable about its fulcrum to a final position within said space to draw said first end of said string into said space; and*

*a closure member for closing the space when the lever is therein, to define a closed configuration wherein said closure member, said element, and said lever means may be relatively immobilized by the application of a security seal, one of said string fixing means providing a plurality of string fixing points to permit adjustment of the effective length of the string or the like.*

*12. A device according to claim 11 wherein the element and the closure member are shaped to hold a flat label therebetween.*

* * * * *